Figure 1:
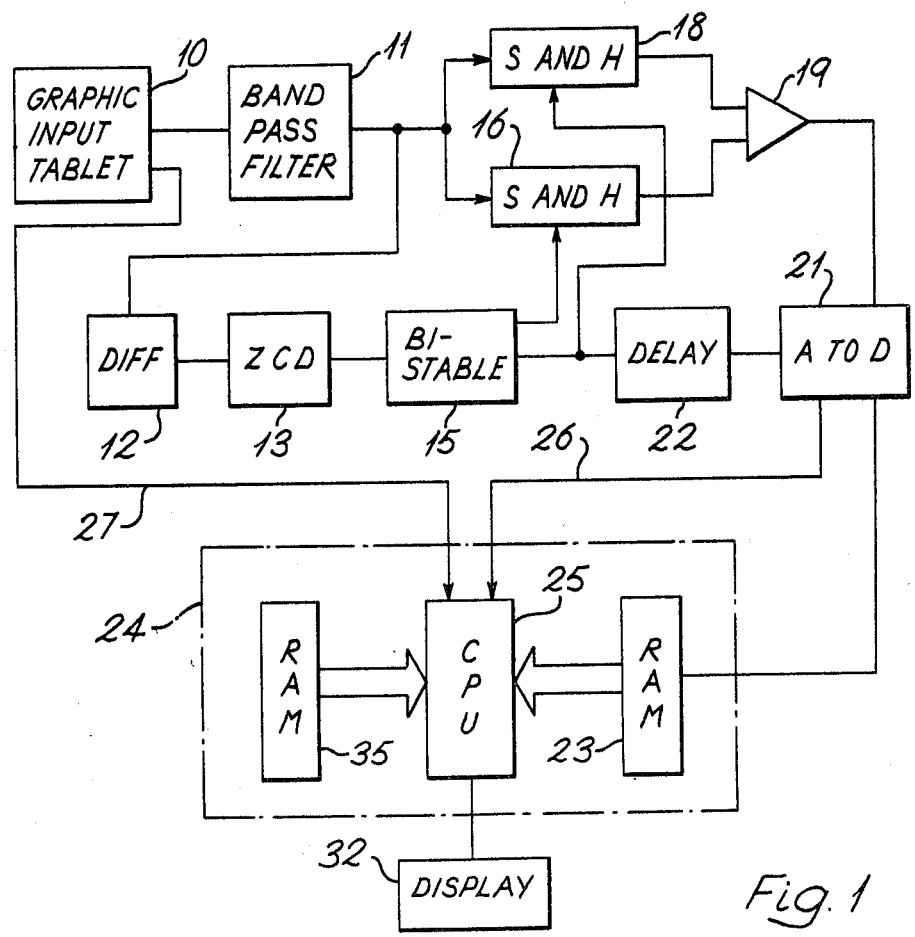

United States Patent [19]

Howbrook

[11] 4,369,431

[45] Jan. 18, 1983

[54] APPARATUS AND METHODS FOR RECOGNIZING HANDWRITTEN SIGNS

[75] Inventor: Ernest Howbrook, Cheadle, England

[73] Assignee: National Research Development Corporation, London, England

[21] Appl. No.: 198,469

[22] Filed: Oct. 20, 1980

[30] Foreign Application Priority Data

Oct. 26, 1979 [GB] United Kingdom ............... 7937165

[51] Int. Cl.³ ............................................. G06K 9/00
[52] U.S. Cl. ......................................... 340/146.3 SY
[58] Field of Search ............ 340/146.3 SG, 146.3 SY, 340/146.3 Q; 178/18–20; 364/728, 819, 820

[56] References Cited

U.S. PATENT DOCUMENTS

| | | | |
|---|---|---|---|
| 3,111,646 | 11/1963 | Harmon | 340/146.3 SG |
| 3,133,266 | 5/1964 | Frishkopf | 340/146.3 SG |
| 3,699,517 | 10/1972 | Dyche | 340/146.3 SY |
| 3,818,443 | 6/1974 | Radcliffe | 340/146.3 SY |
| 3,983,535 | 9/1976 | Herbst et al. | 340/146.3 SY |
| 4,040,011 | 8/1977 | Crane et al. | 340/146.3 SY |
| 4,086,567 | 4/1978 | Crane et al. | 340/146.3 SY |
| 4,190,820 | 2/1980 | Crane et al. | 340/146.3 SY |

FOREIGN PATENT DOCUMENTS 1480066 7/1977 United Kingdom .
1536123 12/1978 United Kingdom .

OTHER PUBLICATIONS

"Signature Recognition for Security Systems" by E. Howbrook, pp. 377–384, Pub. No. 4, IERE Conference on Microprocessors in Automation and Communications held Sep. 1978.

*Primary Examiner*—Leo H. Boudreau
*Attorney, Agent, or Firm*—Cushman, Darby & Cushman

[57] ABSTRACT

Signature recognition by electronics requires large storage capacity and has rates of rejections of true signatures and acceptances of false signatures which are not entirely satisfactory. An apparatus for signature recognition is described in which signatures written on an input table are segmented by detecting zero slope in a waveform corresponding to the signature using a differentiator and a zero-crossing detector. Feature signals held in RAM, corresponding to one or more characteristics of a limited number of segments, for example the first twelve, are correlated against previously obtained reference values, held in RAM, by moving signals to different locations but always comparing the contents of the same pairs of locations which correspond to respective segments. After correlation has been carried out the feature and reference signals for corresponding segments are compared using the microprocessor system to provide a decision on whether to accept or reject a signature.

13 Claims, 7 Drawing Figures

APPARATUS AND METHODS FOR RECOGNIZING HANDWRITTEN SIGNS

The present invention relates to apparatus and methods for recognising handwritten or drawn signs, particularly but not exclusively signatures.

Signature verifiers have already been proposed in which verification depends on a dynamic feature of the signature being written, that is a feature which is not apparent from the signature after it has been written. However such verifiers usually employ a powerful computer and a small but significant rate of rejection of true signatures occurs and at the same time an even smaller rate of acceptance of forgeries also occurs.

The present invention has the object of reducing the size of computer required especially with respect to the amount of storage needed and it is also believed that significant improvement in incorrect rejections and acceptances will be obtained with some embodiments of the invention.

According to a first aspect of the present invention there is provided apparatus for determining whether a predetermined written or drawn sign was made by a specified person, comprising a graphical input tablet for providing a succession of position signals representing the position of a writing instrument on a writing area of the tablet, a band pass filter for processing the position signals, the band pass filter having a lower cut-off frequency greater than 0.25 Hz and an upper cut-off frequency less than 20 Hz, means for segmenting the output signal from the filter on the basis of a characteristic of the signal waveform, means for deriving at least one group of feature signals in which each signal is associated with a respective segment of the filter output signal and represents one characteristic of the segment, each other signal in the group representing the said one characteristic for the associated segment, means for storing a group of reference signals, each nominally associated with the same respective segments as the feature signals, and derived from a number of operations of writing a predetermined sign by a specified person, correlation means for comparing respective signals in each of a plurality of sub groups of feature signals and reference signals associated with the same segment to obtain an overall error for the sub group, and for systematically changing the feature signals associated with respective segments without changing the sequence of feature signals unless, or until, the overall error is within a predetermined limit, or the least possible overall error is obtained, and decision means for comparing respective feature signals and reference signals associated with the same segment after processing by the correlation means to obtain a further overall error for at least most of the feature signals and for providing an indication of whether a sign was apparently made by a specified person on the basis of the further overall error.

It will be understood that the predetermined sign is usually a person's signature.

The position signals are preferably "y" co-ordinate signals in a system of rectangular co-ordinates, where the "y" co-ordinate signal represents movement approximately normal to the general direction in which the signature progresses as it is written.

The correlation means may change the feature signals associated with respective segments without changing the sequence of feature signals by omitting up to a limited number of feature signals or adding up to a limited number of dummy feature signals.

The means for segmenting the output signal from the filter may conveniently include means for segmenting by detecting points of zero slope in the output waveform from the filter. The means for deriving a feature signal may then include means for determining the difference in the "y" co-ordinates of at least some pairs of successive points of zero slope.

The means for storing reference signals, the correlation means and the decision means may be formed by a microprocessor central processing unit (CPU) and its associated random access memory. It will be appreciated that the division between a microprocessor and the rest of the circuit may vary in different embodiments of the invention.

The segmenting means may provide between eight and sixteen segments for each sign, rejecting any further segments which might otherwise be produced. The correlation means may then take a sub group of about one third of the segments so generated and compare the feature signals associated with these segments with reference signals associated with nominally the same segments.

The correlation means may function by positioning reference signals in certain storage locations each associated with a predetermined segment and positioning feature signals in other locations each corresponding to a reference signal storage location and to a segment. The correlating means may then move feature signals to different locations and/or insert dummy feature signals in certain locations while comparing the contents of corresponding locations, for example by multiplication, until a minimum overall value, or an acceptable overall value is acheived, or a predetermined number of comparisons has been carried out.

According to a second aspect of the present invention there is provided a method for determining whether a predetermined written or drawn sign was made by a specified person, the method comprising the steps of obtaining a succession of position signals representing the position of a writing instrument used in making the sign, filtering the position signals using a filter having a lower cut-off frequency greater than 0.25 Hz and an upper cut-off frequency less than 20 Hz, segmenting the filtered signal on the basis of a characteristic of the filtered signal, deriving at least one group of feature signals in which each signal is associated with a respective segment of the filtered signal and represents one characteristic of the segment, each other signal in the group representing the said one characteristic for the associated segment, storing a group of reference signals, each associated with the same respective segments as the feature signals and derived from a number of operations of writing the predetermined sign by the specified person, correlating the feature signals and reference signals by comparing respective signals in each of a plurality of sub groups of feature signals and reference signals associated with the same segment to obtain an overall error for the sub group, and systematically changing the feature signals associated with respective segments without chaning the sequence of feature signals unless, or until, the overall error within a predetermined limit or the least possible overall error is obtained, and comparing respective feature signals and reference signals associated with the same segment after correlation to obtain a further overall signal for at least most of the feature signals and providing an indication of whether a sign was apparently made by the specified person on the basis of the further overall error.

Figure 2:
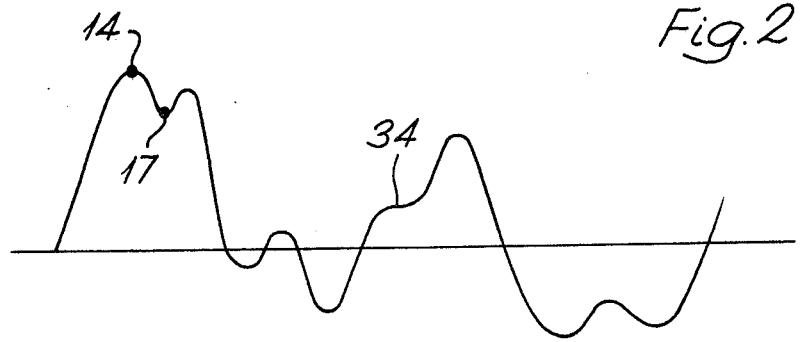
Figure 3:
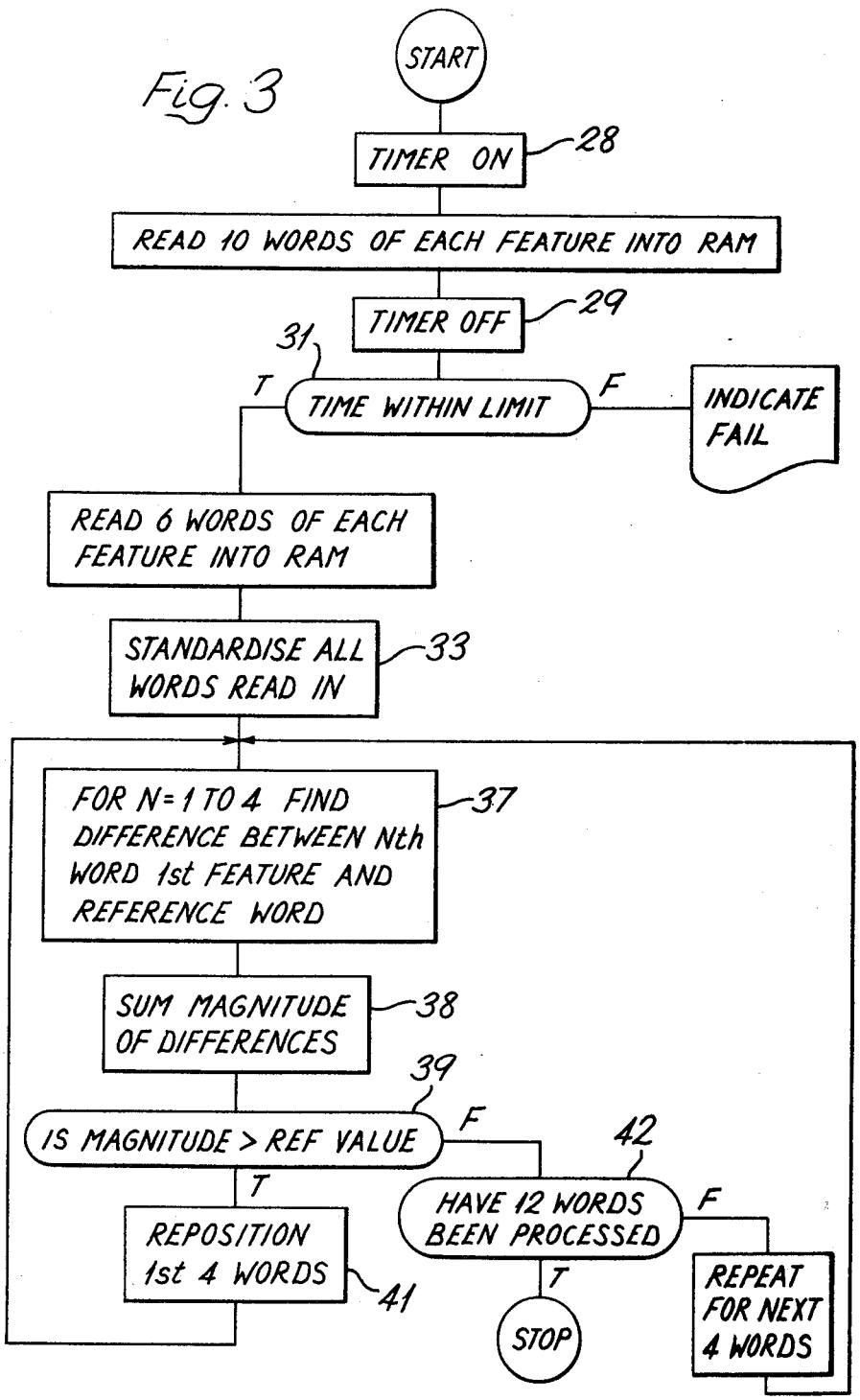
Figure 4:
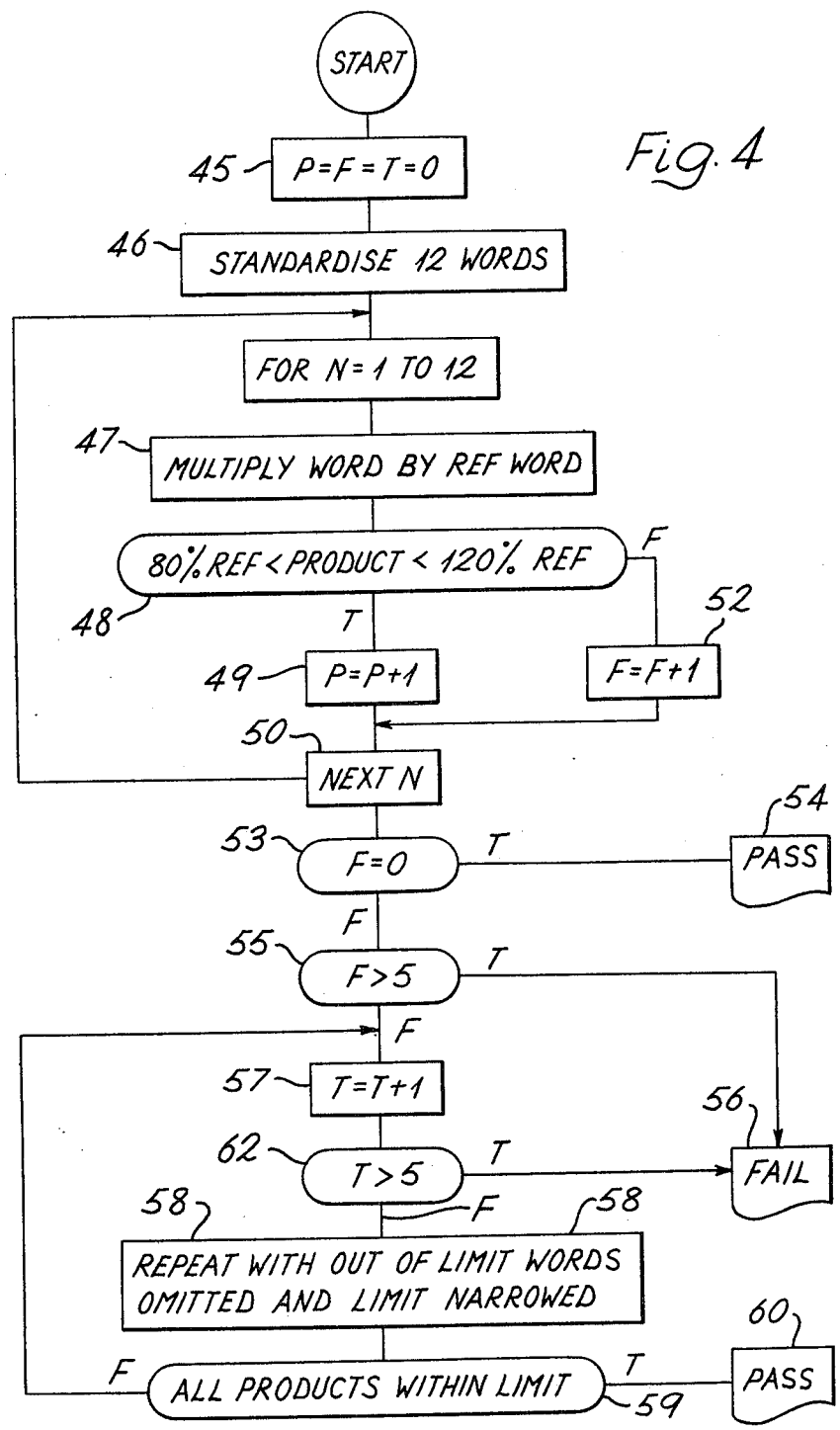
Figures 5A, 5B:
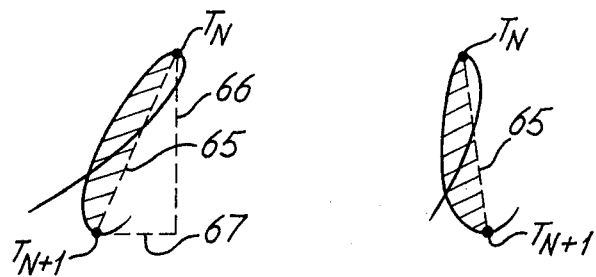
Figure 6:
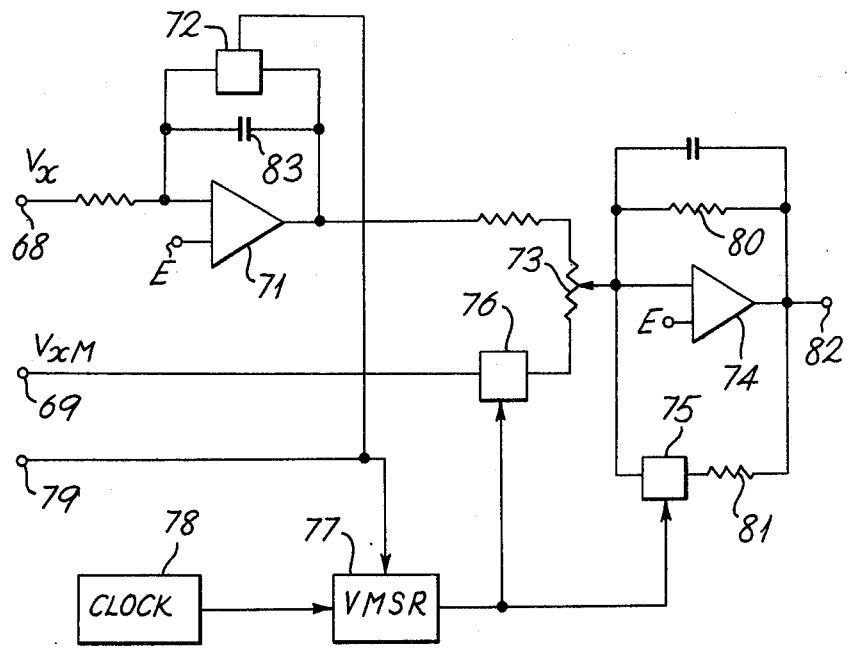

Certain embodiments of the invention will now be described by way of example, with reference to the accompanying drawings, in which:

FIG. 1 is a block diagram of signature recognition apparatus according to the invention, FIG. 2 is a waveform used in describing the operation of FIG. 1, FIG. 3 is a flow chart explaining part of the operation of the CPU 25 of FIG. 1, FIG. 4 is a further flow chart used in explaining the operation of the CPU 25, FIGS. 5(a) and 5(b) represent portions of a signature illustrating a feature which may be used in signature recognition, and FIG. 6 is a block diagram of a circuit used in deriving the feature described in connection with FIGS. 5(a) and 5(b).

Signatures to be verified are written on a graphic input tablet 10 which may be of the type described in U.K. Patent Specification No. 1,536,123. Analogue signals representing "y" co-ordinates of the position of the pen used with the graphic input tablet are passed through a bandpass filter 11 with the object of removing both the d.c. component of the "y" co-ordinate signal and high frequency signals which can be regarded as "noise" and are caused by small indeterminate movements of the pen.

Segmentation into twelve segments is now carried out on the basis that each segment extends from one zero-slope point in the bandpass-filter output signal to the next zero-slope point. To obtain these points the signal from the bandpass filter is passed to a differentiation circuit 12 and then to zero crossing dete detector 13.

"Vertical" excursion (that is excursion in the "y" co-ordinate direction) is the first "feature" extracted from each segment in this embodiment. Extraction is carried out as follows:

When the first zero-slope point 14 (see FIG. 2) in the filter output signal is detected a bistable circuit 15 enters a first conduction state in which a sample and hold circuit 16 receives and holds the value of the filter output signal at the zero-slope point 14. When the next zero-slope point 17 in the filter output waveform is received the zero crossing detector 13 causes the bistable 15 to enter its other conduction state and the value of the filter output signal is held by a sample and hold circuit 18. A differential amplifier 19 now provides an output proportional to the difference in values between the zero slope points 14 and 17 in the filter output signal and this value is converted to a digital signal by means of an analogue to digital converter 21 when enabled by way of a delay circuit 22. Thus shortly after each second zero-slope is detected the analogue to digital converter samples the output of the operational amplifier 19 and reads the result into a portion 23 of random access memory in a microprocessor system 24.

Since the A to D converter is enabled by the delay circuit 22 only when alternate zero crossings are detected only alternate excursions between zero-slope points are logged as feature signals into the RAM portion 23, other excursions being omitted.

The central processing unit (CPU) 25 of the microprocessor which may for example be a Z 80 manufactured by MOSTEK, is programmed to store successive digital signals from the converter 21 in successive locations of its RAM and in order to carry this out it receives a signal by way of a connection 26 from the converter 21 each time the converter is ready to provide an output signal.

The CPU is programmed to time the generation of the first ten digital words by the converter 21. When the pen used with the graphic input tablet first touches the tablet a microswitch (not shown) in the pen closes and passes a signal along a connection 27 to the CPU 25. This starts a timing operation 28 (see FIG. 3) in the microprocessor programme which is terminated in operation 29 after ten words have been read into the RAM. The time for reading in the first ten words is compared in operation 31 with a limit obtained, as will be described later, by averaging the times taken by the user to write a number of specimen signatures. The limit is usually ±20% on this average time. If the time taken to write the first ten words into the RAM exceeds the limit a display 32 indicates that the signature has failed to prove authentic.

If however the test 31 is successfully passed a further six digital words are read into the RAM 23 when the programmed CPU accepts no further words and operates on the words received to determine whether the signature should be accepted or rejected.

Before proceeding further an approximate standardisation of the words read in is carried out by the programmed CPU. The values represented by the digital words are summed and the result is compared with a reference value, each value then being divided by the ratio of the sum to the reference value and rewritten in its original RAM location, this operation being designated 33 in FIG. 3.

A portion of the waveform of FIG. 2, such as the point of inflection 34, may or may not occur in a genuine signature depending on day to day variations in the way the signature is written. Clearly segmentation will not be consistent from one signature to another if such a "break" in the way the signature is written occurs. Tests carried out on a number of people indicate that 50% produce a signature with one such break, about 25% with two such breaks and 10% with three breaks or indeterminate data. In order to overcome this problem the correlation procedure, now to be described, is carried out but it will be realised that it is the segmentation of the first part of the signature, or all the signature into a fairly small number of segments, say eight to twenty, which allows the following simple correlation procedure to be carried out.

A portion 35 of the microprocessor RAM holds reference data relating to signatures of the person to be verified which are obtained in a way described later. Successive locations of the RAM portion 35 store words corresponding to nominally the same respective segments as the words stored in the RAM portion 23 but for reasons described above it is necessary to correlate the words stored in the RAM portion 23 with those in the RAM portion 35 and this is, in this example, carried out by testing for correlation and then adjusting locations of the words in the RAM portion 23 until they correspond in position with locations of words in the RAM portion 35.

However to carry out this correlation procedure for the whole word could mask correct correlation, especially where two "breaks" occur. For this reason, in a first part of the procedure, only the first four words in the RAM portion 23 are compared with the first four words in the RAM portion 35, this being carried out by finding the difference between corresponding word values in an operation designated 37 in FIG. 3. The magnitudes of of these differences are summed in operation 38 and compared with a reference value in test 39, the reference value being, for example, 20% of the sum of the word values obtained in operation 33. Assuming that at a first attempt the test 39 shows that the magnitude of the sum of the difference is greater than the reference value then an operation 41 is carried out in which the locations of some of the words in the RAM 23 are changed. In this example the second word is omitted, the third to fifth words are moved into the positions of the second to fourth words. Operations 37 to 39 are then repeated and if test 39 again shows that the sum of the magnitude of the differences is greater than the reference value operation 41 is again carried out but in this instance a dummy value which may for example be the value of the first word repeated is placed in location 2. Operations 38 to 39 are again carried out and if it is necessary to repeat operation 41 the same type of repositioning is carried out for the third word as was carried out for the second word. This procedure is followed until either the test 39 indicates that the sum of the magnitude of the differences is less than the reference value or until the position of all four words in the RAM 23 have been changed. If this point is reached the first four words are located in positions which give the least value for the sum of the magnitude of the differences. At this point or the first time the sum of the magnitude of the differences is less than the reference value the procedure is repeated for each of the next two groups of four words held in the RAM portion 23 until the twelve words are finally in optimum positions in the RAM portion 23. At this point a test 42 is satisfied and the correlation procedure is complete.

It will be appreciated that the correlation procedure may cause words in the RAM 23 to be deleted or a number of additional "dummy" words to be inserted but the procedure finishes when twelve words have been successfully located in the RAM portion 23, whether these words be the original twelve words, some of the original sixteen words, a mixture of words read in and "dummy" words or some combination of these possibilities.

The description so far has been concerned only with a single feature of the signature written, that is the height, or maximum excursion within each segment but it will be appreciated that further features of each signature, as will be described later, can be used as an alternative, or an addition, to the "height" feature.

Each feature signal, represented by a feature word, optimally positioned in the RAM portion 23 is now compared with the word in the corresponding position in the RAM portion 35 representing the reference value of the feature concerned in the segment corresponding to the location. A flow chart for this procedure which is carried out by the CPU 25 is shown in FIG. 4. First an initialising step 45 is carried out in which three variables P, F and T are set to zero. Each of the twelve words in the RAM portion 23 is then standardised in operation 46 and replaced in its optimum location. Standardisation is carried out by summing the values of the twelve words, dividing the sum into the value for each word and multiplying the result obtained by a reference value.

Next each feature word is multiplied by a reference word, obtained (as is described below) from a number of signatures previously written by the person writing the signature to be validated. Each reference word is the reciprocal of the word expected so that the above described multiplication operation, designated 47 in FIG. 4, is nominally expected to provide an output value equal to the reference value used in the standardisation procedure 46.

A test 48 is then carried out to determine whether the product obtained is between 80 and 120% of the reference value. If so the variable P is increased by one (operation 49) and the next of the twelve words is subjected to the same procedure by means of operation 50. Should the test 48 be failed the variable variable F is increased by one in step 42 and the next word is considered by way of operation 50.

Each of the twelve words is subjected to the above procedure and when completed a test 53 is carried out to discover whether all words have passed test 48. If so then the computer provides an indication 54 that the signature is valid. However should the test 53 be failed then a further test 55 is carried out to determine whether more than five word products failed the test 45. If so then the computer indicates that the signature is invalid by means of an output 56. However if less than five word products have failed the test 48 then the variable T is increased by one in operation 57 and the procedure described in relation to operations 47 and 48 is repeated in operation 58 with those words which failed the test 48 omitted and the limit applied in test 48 narrowed. For example if only one word failed the test then the limit 48 may be changed and a pass is then obtained if each product is between 85 and 115% of the reference value. This is indicated in test 59 and if the test is successful an indication is given at output 60. On the other hand the procedure is repeated if test 59 is failed with one further word removed, and the limit narrowed, this procedure being carried out until either up to five words have been removed, as indicated by a test 62, or a pass has been indicated. If even after five words have been removed each product is not within limits then the test 62 causes a fail output output 56 to be given.

Tests carried out indicate that using the "vertical" excursion of the pen, that is the "y" co-ordinate excursion in each segment as the feature measured, as described above, only about one out of every hundred people or signature attempts are close to being verified by mistake and a genuine writer is rejected about one in five times.

If a second feature could be found having the same discrimination but completely unrelated to the first, then a combined discrimination could be close to one hundred times better. Although this is unrealistic it servies to indicate the merit in a second feature and possibly third and fourth features.

Curvature is now considered as a further possible feature but it may be masked by the slope of writing forming a signature.

In FIGS. 5(a) and 5(b) two segments are shown resulting from the writing of the letter "l" in different ways. Each segment starts at time $T_N$ and finishes at time $T_{N+1}$.

The area between the line 65 and the segment is a measure of curvature but this area cannot be obtained simply from the "x" co-ordinate excursion during the segment period because the slope of the writing also affects the "x" excursion.

The circuit shown in FIG. 6 generates a signal proportional to the required area by finding the area delimited by the segment, the vertical 66 and the horizontal 67 and subtracting the area delimited by the lines 65, 66 and 67. A time average for this feature signal is found by dividing by the period of the segment. Hence the circuit of FIG. 6 generates a voltage $V_c$ given by $$V_c = \frac{1}{T_M}\left(\int_0^{T_M} V(x)dt - \tfrac{1}{2}V_{xM}T_M\right)$$

where $T_M$ is the interval between $T_N$ and $T_{N+1}$, $V_x$ is the x signal voltage, and $V_{xM}$ is the x signal voltage at time $T_{N+1}$.

In FIG. 6 the voltage $V_x$ is applied at a terminal 68 and integrated by an operational amplifier 71 connected as an integrator.

The integrator is set to zero at time $T_N$ by a pulse applied to a terminal 79 and derived by the zero-crossing detector 13 of FIG. 1. This pulse closes a bilateral switch 72 shorting a feedback capacitor 83 for the amplifier 71. The voltage at time $T_{N+1}$, as determined by the zero-crossing detector, is applied to a terminal 69 and multiplied by the time $T_M$ by means of a bilateral switch 76 operated by a variable mark/space ratio (VMSR) circuit 77. After zeroing at time $T_N$ by the pulse applied to the terminal 79, the mark/space ratio of the output waveform of the VMSR circuit 77 increases linearly with time, so that the signal appearing at the output of the switch 76 is proportional to the product $V_{xM}T_M$. A clock circuit 77 is required by the VMSR circuit in generating its output waveform.

The output signal of the amplifier 71 and the signal at the output of the switch 76 are subtracted using a potentiometer 73, which is set by obtaining a zero output for a straight line segment.

An amplifier 74 connected as an integrator is used to divide the signal at the output of the potentiometer 73 by time since the resistance of a resistor 80 is much greater than that of a resistor 81. The required signal proportional to $V_c$ is obtained at a terminal 82.

Curvature to the right gives a positive output signal while curvature to the left gives a negative output signal but sign is only important for large curvatures since small curvatures may be of opposite signs for the same letter. Thus in signature recognition when placing limits of acceptability on signals representing curvature, little significance is attached to small signals while more significance is attached to larger signals.

In using the curvature feature, the segments are first correlated using, for example the "y" excursion feature (although another feature such as curvature could be used). The curvature signals corresponding to segments are stored in locations associated with correlated segments.

The procedure given in FIG. 4 is then expanded to include the curvature feature and provide a more sensitive validation test. For example twenty-four words can be tested instead of twelve: the first twelve words relating to vertical excursion and the second twelve words relating to curvature.

Other features are now discussed.

Signals $\theta x$ and $\theta y$ can be made available which correspond to the angle of the pen from the upright position in x, and y axis directions, respectively. It is possible to use these signals as they stand for further features. However, as the signals are strongly related to finger movements which are right handed or left handed, a preferred arrangement is to combine the two to form maxima for left or right. For example, by deriving $(\theta y + \theta x)$ and $(\theta y - \theta x)$ signals are obtained which correspond to turning the x and y axes through plus and minus 45°. This maximises the pen angle because a right handed person usually points the upper end of his pen towards the bottom right corner of the paper and a left handed person usually points the upper pen end towards the bottom left corner of the paper. With this feature incorporated, it is very probable that a right handed signature will only be verified by a right handed writer, with the additional bonus that the finger movements must be correct as well as the written signature.

Many other features may be extracted from the signals; moreover it is not essential that the feature should be derived sequentially. It is possible, for example, to allocate 12 locations in the RAM portion 23, for special data, which are not realigned or moved by segment correlation. The data for these locations are obtained during the signature writing and processed sequentially into locations at the end. The data may be any average characteristics; for example the first location may contain the average slope; the second location the ratio of high frequency signals to the average signal; the third location the ratio of the time the pen is in contact with the writing area to time out of contact; and the fourth location the ratio of the maximum height to length of the signature.

In order to obtain the reference values for use in operation 47 of FIG. 4 where words representing the values of features in segments are multiplied by reference values, a number of signatures are written by each person whose signature is to be validated.

Each signature is segmented and a series of feature signals found using apparatus similar to that of blocks 10 to 23 of FIG. 1. However the value of each feature for each segment is displayed rather than being immediately stored. An operator then decides which, if any, segments in any particular signature should be ignored for the purposes of obtaining the reference value. It may become clear from this procedure that a certain person's signature is unsuitable for validation by the apparatus and methods described. However in nearly all cases it is possible to select a number of values for each feature for each particular segment and average and standardise these values to provide suitable reference words. It should be noted however that as mentioned earlier it is the reciprocal of these reference words which are stored in the RAM portion 35 and used in operation 47 of FIG. 4.

Certain embodiments of the invention have been specifically described but it will be apparent that the invention can be put into operation in many other ways for example by using different features or combinations of features for each segment, by segmenting in other ways provided a suitable number of segments for each signature is obtained and by using different algorithms for the correlation of segments and for determining whether to accept or reject signatures.

I claim:

1. A method for determining whether a predetermined sign was made by a specified person, the method comprising the steps of
obtaining a succession of position signals representing the position of a writing instrument used in making the sign,
filtering the position signals using a filter having a lower cut-off frequency greater than 0.25 Hz and an upper cut-off frequency less than 20 Hz,
segmenting the filtered signal on the basis of a characteristic of the filtered signal, deriving at least one group of feature signals in which each signal is associated with a respective segment of the filtered signal and represents one characteristic of the segment, each other signal in the group representing the said one characteristic for the associated segment,
storing a group of reference signals, each associated with the same respective segments as the feature signals and derived from a number of operations of writing the predetermined sign by the specified person,
correlating the feature signals and reference signals by comparing respective signals in each of a plurality of sub groups of feature signals and reference signals associated with the same segment to obtain an overall error for the sub group, and systematically changing the feature signals associated with respective segments without changing the sequence of feature signals until the overall error is within a predetermined limit or the least possible overall error is obtained, and
comparing respective feature signals and reference signals associated with the same segment after correlation to obtain a further overall signal for at least most of the feature signals and providing an indication of whether a sign was apparently made by the specified person on the basis of the further overall error.

2. Apparatus for determining whether a predetermined sign was made by a specified person, comprising
a graphical input tablet for providing a succession of position signals representing the position of a writing instrument on a writing area of the tablet,
a band pass filter for processing the position signals, the band pass filter having a lower cut-off frequency greater than 0.25 Hz and an upper cut-off frequency less than 20 Hz,
means for segmenting the output signal from the filter on the basis of a characteristic of the signal waveform,
means for deriving at least one group of feature signals in which each signal is associated with a respective segment of the filter output signal and represents one characteristic of the segment, each other signal in the group representing the said one characteristic for the associated segment,
means for storing a group of reference signals, each nominally associated with the same respective segments as the feature signals, and derived from a number of operations of writing a predetermined sign by a specified person,
correlation means for comparing respective signals in each of a plurality of sub groups of feature signals and reference signals associated with the same segment to obtain an overall error for the sub group, and for systematically changing the feature signals associated with respective segments without changing the sequence of feature signals until the overall error is within a predetermined limit, or the least possible overall error is obtained, and
decision means for comparing respective feature signals and reference signals associated with the same segment after processing by the correlation means to obtain a further overall error for at least most of the feature signals and for providing an indication of whether a sign was apparently made by a specified person on the basis of the further overall error.

3. Apparatus according to claim 2 wherein the correlation means changes the feature signals associated with respective segments without changing the sequence of feature signals in one of the following ways: by omitting up to a limited number of feature signals, by adding up to a limited number of dummy feature signals.

4. Apparatus according to claim 2 for use where the predetermined sign is a signature, wherein the graphical input tablet provides position signals representing the "y" co-ordinates of the writing instrument in a system of rectangular co-ordinates, where the "y" co-ordinate represents movement approximately normal to the general direction in which the signature progresses as it is written.

5. Apparatus according to claim 2 wherein the means for segmenting the output signal from the filter segments by detecting points of zero slope in the output waveform of the filter.

6. Apparatus according to claim 4 wherein the means for deriving feature signals includes means for determining the difference in the "y" co-ordinates of at least some pairs of successive points of zero slope in the output waveform of the filter.

7. Apparatus according to claim 2 wherein the means for deriving feature signals includes means for determining the curvature of portions of the sign as represented by at least one of the segments of the filter output signal.

8. The apparatus according to claim 7 for use where the predetermined sign is a signature, wherein the graphical input tablet provides voltage $V_x$ representing the "x" co-ordinates of the writing instrument in a system of rectangular co-ordinates, where the "x" co-ordinate represents movement in the approximate direction in which the signature progresses as it is written, and the means for deriving feature signals includes means for generating a voltage $V_c$ given by $$V_c = \frac{1}{T_M}\left( \int_0^{T_M} V(x)dt - \tfrac{1}{2}V_{xM}T_M \right)$$

where
$T_M$ is the interval between $T_N$ and $T_{N+1}$,
$T_N$ is the time at which a segment commences,
$T_{N+1}$ is the time at which that segment ends, and
$V_{xM}$ is the value of $V_x$ at time $T_{N+1}$.

9. Apparatus according to claim 2 for use where the predetermined sign is a signature, wherein the segmenting means provides signals representing between eight and sixteen segments for each signature.

10. Apparatus according to claim 9 wherein the correlation means compares each of the feature signals associated with a group of between three and five segments inclusive with reference signals associated with nominally the same respective segment, determines a value representative of the overall degree of similarity of the comparisons and, unless the value determined is within a predetermined range, associates at least some of the same feature signals with other segments in the same group, compares the newly associated feature signals with the reference signals associated with nominally the same respective segments, and again determines the said value, the steps of reassociating feature signals with segments, comparison and determining the said value continuing until either the said value falls within the said range or a predetermined number of cycles of the said steps have been carried out.

11. Apparatus according to claim 2 wherein the means for storing reference signals stores signals associated with between three and five segments, inclusive, in first storage locations each associated with a predetermined segment, the correlation means stores feature signals nominally associated with the same segments in second storage locations each respectively associated with these segments, compares reference and feature signals by comparing the contents of first and second storage locations associated with the same segment, and unless the comparisons indicate at least a predetermined similarity moves at least some of the feature signals to different second storage locations and again compares the contents of first and second storage locations associated with the same segment, the steps of moving feature signals to new second storage locations and comparing contents of locations being continued until the comparisons indicate at least the said predetermined similarity unless a predetermined number of cycles of relocation and comparison have been carried out.

12. Apparatus according to claim 2 including means for generating a timing signal representing the time required for generation of feature signals representing a predetermined number of segments, and means for indicating that a sign was not made by a specified person if the timing signal exceeds a reference value.

13. Apparatus according to claim 2 wherein at least the correlation means and the decision means are formed by a microprocessor central processing unit and an associated random access memory.

* * * * *